US011262882B2

(12) United States Patent
Terakawa et al.

(10) Patent No.: US 11,262,882 B2
(45) Date of Patent: Mar. 1, 2022

(54) TOUCH SENSOR AND MANUFACTURING METHOD OF TOUCH SENSOR

(71) Applicant: Roland Corporation, Shizuoka (JP)

(72) Inventors: Yuka Terakawa, Tokyo (JP); Kensuke Suzuki, Tokyo (JP); Hiroshi Okamura, Shizuoka (JP); Hajime Hisamitsu, Shizuoka (JP)

(73) Assignee: Roland Corporation, Shizuoka (JP)

( * ) Notice: Subject to any disclaimer, the term of this patent is extended or adjusted under 35 U.S.C. 154(b) by 137 days.

(21) Appl. No.: 16/544,914

(22) Filed: Aug. 20, 2019

(65) Prior Publication Data

US 2020/0064953 A1   Feb. 27, 2020

(30) Foreign Application Priority Data

Aug. 22, 2018   (JP) .............................. JP2018-155279

(51) Int. Cl.
*G06F 3/045* (2006.01)
(52) U.S. Cl.
CPC .... *G06F 3/045* (2013.01); *G06F 2203/04103* (2013.01)
(58) Field of Classification Search
CPC ........... G06F 3/045; G06F 2203/04103; G06F 2203/0339; G06F 2203/04106; G06F 2203/04105; G06F 1/3271; G06F 3/0338; G06F 1/3215; G06F 11/3093; G06F 11/3062; G06F 3/04; G01L 1/20; Y02D 10/00
See application file for complete search history.

(56) References Cited

U.S. PATENT DOCUMENTS

| 2004/0056669 A1* | 3/2004 | Morimoto ........... G06F 11/3093 |
| | | 324/691 |
| 2012/0068965 A1 | 3/2012 | Wada et al. |
| 2012/0113054 A1 | 5/2012 | Hashimoto et al. |

(Continued)

FOREIGN PATENT DOCUMENTS

| JP | H0659795 | 3/1994 |
| JP | 2011076172 | 4/2011 |

(Continued)

OTHER PUBLICATIONS

"Office Action of Europe Counterpart Application", dated Oct. 30, 2020, p. 1-p. 5.

(Continued)

*Primary Examiner* — Lunyi Lao
*Assistant Examiner* — Jarurat Suteerawongsa
(74) *Attorney, Agent, or Firm* — JCIPRNET (57) ABSTRACT

A touch sensor in which an increase in manufacturing processes is suppressed and which can be provided inexpensively is obtained. A touch sensor (1) has a structure in which resistance membranes (12A, 12B) and membranes (13A, 13B) made of pressure sensitive ink are formed on predetermined places of a film (11), two parts (11A, 11B) on which the resistance membranes (12A, 12B) are formed are interfolded so that the resistance membranes (12A, 12B) face each other, two parts (11C, 11D) on which the membranes (13A, 13B) are formed are interfolded so that the membranes (13A, 13B) face each other, and the interfolded two parts are further interfolded.

11 Claims, 9 Drawing Sheets

(56) References Cited

U.S. PATENT DOCUMENTS

| | | | |
|---|---|---|---|
| 2016/0147352 A1* | 5/2016 | Filiz | G06F 3/045 |
| | | | 345/173 |
| 2016/0209441 A1* | 7/2016 | Mazzeo | G06F 3/0444 |
| 2017/0153153 A1* | 6/2017 | Eventoff | G06F 3/0446 |
| 2018/0067614 A1 | 3/2018 | Hong | |
| 2018/0317314 A1* | 11/2018 | Olberding | H03K 17/962 |
| 2019/0004651 A1* | 1/2019 | Hong | G06F 3/0443 |

FOREIGN PATENT DOCUMENTS

| | | |
|---|---|---|
| JP | 2017073353 | 4/2017 |
| JP | 2017119080 | 7/2017 |
| WO | 2015106183 | 7/2015 |

OTHER PUBLICATIONS

"Search Report of Europe Counterpart Application", dated Nov. 20, 2019, p. 1-p. 8.

* cited by examiner

TOUCH SENSOR AND MANUFACTURING METHOD OF TOUCH SENSOR

CROSS-REFERENCE TO RELATED APPLICATION

This application claims the priority benefits of Japan Patent Application No. 2018-155279, filed on Aug. 22, 2018. The entirety of the above-mentioned patent application is hereby incorporated by reference herein and made a part of this specification.

BACKGROUND OF THE DISCLOSURE

Technical Field

The disclosure relates to a touch sensor capable of detecting a contact position and a contact pressure.

Related Art

There is an electronic device having a front surface panel. In addition, there is an electronic device in which a touch panel for detecting a contact of a human finger or the like with the front surface panel is incorporated. The touch panel may be a touch panel including a touch sensor capable of detecting both a contact position (hereinafter referred to as touch position) and a contact pressure (hereinafter referred to as pressing pressure or a touch pressure) in the contact with human finger or the like.

In patent literature 1, an electronic device which has a touch operation input portion including a touch pressure detection portion and a touch position detection portion is described (see paragraph 0016). The touch operation input portion detects a touch operation performed by a user. Specifically, the touch pressure detection portion is configured by a pressure sensitive sensor and detects a touch pressure generated by the touch operation of the user. The touch position detection portion is configured by a position input sensor of a capacitance type or a resistance membrane type (a pressure sensitive type). The touch position detection portion detects a touch coordinate.

In patent literature 2, an electronic device which has a touch sensor for detecting a contact position and a pressure sensitive sensor is described (see paragraphs 0030, 0031). Specifically, the touch sensor detects a contact position of a detection object (for example, a human finger) and outputs a detection signal corresponding to a coordinate of the contact position. The pressure sensitive sensor detects a touch pressure according to changes of an inter-electrode capacitance generated by deflection of the input operation portion for example.

LITERATURE OF RELATED ART

Patent Literature

[Patent literature 1] Japanese Laid-Open No. 2017-119080
[Patent literature 2] Japanese Laid-Open No. 2011-76172

In the electronic device described in patent literature 1, the touch pressure detection portion is formed separately from the touch position detection portion. In the electronic device described in patent literature 2, the pressure sensitive sensor is also formed separately from the touch sensor (a sensor for detecting a contact position in patent literature 2). When a sensor for detecting the pressing pressure (the touch pressure detection portion or the pressure sensitive sensor) and a sensor for detecting the touch position (the touch position detection portion) are formed separately, it is necessary to separately incorporate the two sensors into the electronic device, and thus manufacturing processes increase. In addition, separate preparation of each sensor causes an increase in the price of the sensors as a whole.

In addition, because the sensor for detecting the touch position is formed separately from the sensor for detecting the pressing pressure, it is required to separately draw respective signal lines from a detection portion of each sensor. Accordingly, the manufacturing processes increase when manufacturing the electronic device. Besides, the increase in the manufacturing processes leads to a price rise of the electronic device.

The disclosure is provided to obtain a touch sensor in which an increase in manufacturing processes is suppressed and which can be provided inexpensively.

SUMMARY

The touch sensor of the disclosure has a structure in which one base material includes four parts, a resistance membrane for position detection is formed on each of a first part and a second part which are two adjacent parts of the four parts, a resistance membrane being pressure sensitive is formed on each of a third part and a fourth part which are the other two adjacent parts of the four parts, the second part is laminated by being folded with respect to the first part, and the third part is laminated by being folded with respect to the fourth part, and the two parts formed by folding are interfolded.

The touch sensor of another aspect of the disclosure includes: a first part on which a resistance membrane for position detection is formed, a second part which is located below the first part and on which a resistance membrane for position detection is formed, a third part which is located below the second part and on which a resistance membrane being pressure sensitive is formed, and a fourth part which is located below the third part and on which a resistance membrane being pressure sensitive is formed.

In a manufacturing method of touch sensor of the disclosure, a resistance membrane for position detection is formed on each of a first part and a second part which are two adjacent parts of four parts in a base material including the four parts, a resistance membrane being pressure sensitive is formed on each of a third part and a fourth part which are the other two adjacent parts of the four parts, the second part is laminated by being folded with respect to the first part, the third part is laminated by being folded to the fourth part, and the two parts formed by folding are interfolded.

BRIEF DESCRIPTION OF THE DRAWINGS

FIG. 4(A) to FIG. 4(F) are illustration diagrams for illustrating a manufacturing method of the touch sensor.

FIG. 8(A) to FIG. 8(C) are plan views showing another example of the expanded state (the state before a use form is formed) of the touch sensor.

DESCRIPTION OF THE EMBODIMENTS

Embodiments of the disclosure are described below with reference to the diagrams.

Figure 1A:
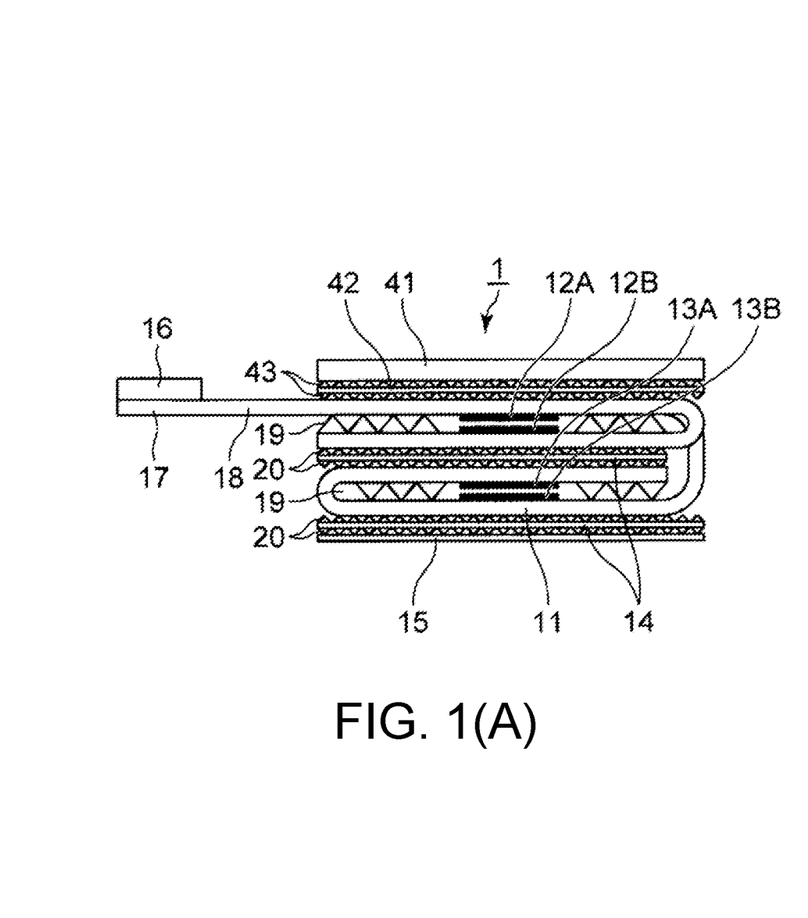
FIG. 1(A) is a cross-sectional view showing a touch sensor of an embodiment of the disclosure.
Figure 1B:
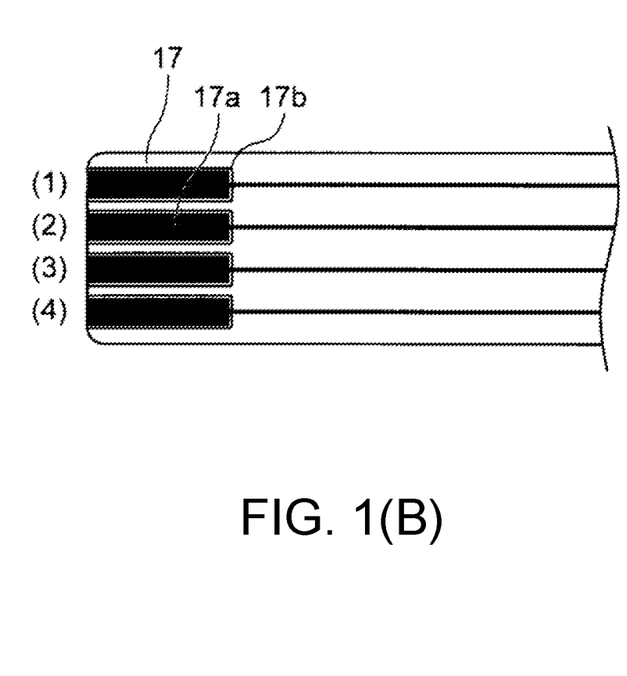
FIG. 1(B) is a plan view showing a terminal portion in the touch sensor.

FIG. 1(A) is a cross-sectional view showing a touch sensor 1 of an embodiment of the disclosure. Besides, FIG. 1(B) is a plan view showing a terminal portion in the touch sensor.

The touch sensor 1 has a structure in which a position sensor and a pressure sensitive sensor are formed on a part of a folded sheet (a film) 11. In this embodiment, resistance membranes 12A, 12B which function as the position sensor are formed. In addition, membranes 13A, 13B made of pressure sensitive conductive ink (hereinafter referred to as pressure sensitive ink) which function as the pressure sensitive sensor are formed.

The film 11 includes four parts (a first part, a second part, a third part, and a fourth part). In a state that the film 11 is folded, the four parts are laminated.

As described later, a surface on which the resistance membrane 12A in the first part (corresponding to a part 11A shown in FIG. 2) of the film 11 is formed and a surface on which the resistance membrane 12B in the second part (corresponding to a part 11B shown in FIG. 2) of the film 11 is formed are adhered by a pressure sensitive adhesive (a printing paste) 19. A surface on which the membrane 13A in the third part (corresponding to a part 11C shown in FIG. 2) of the film 11 is formed and a surface on which the membrane 13B in the fourth part (corresponding to a part 11D shown in FIG. 2) of the film 11 is formed are also adhered by the pressure sensitive adhesive 19. Besides, in each part, the surface on which the resistance membranes 12A, 12B or the membranes 13A, 13B are formed is set as a front surface. The surface on which the resistance membranes 12A, 12B or the membranes 13A, 13B are not formed is set as a rear surface.

The rear surface of the second part and the rear surface of the third part are adhered by a double-face tape (a double-face adhesive tape). In regard to the double-face tape, an adhesive 20 is laminated on a front surface and a rear surface of a support (a setting plate) 14. Besides, in FIG. 1(A) and FIG. 1(B), a separating member (a separator) 15 of the double-face tape of the rear side of the third part is also shown.

Besides, in the embodiment, the front surface of the first part of the film 11 and the front surface of the second part of the film 11 are adhered by the pressure sensitive adhesive 19, the front surface of the third part and the front surface of the fourth part are adhered by the pressure sensitive adhesive 19, and the rear surface of the second part and the rear surface of the third part are adhered by the double-face tape, but each adhesion means is not limited to the pressure sensitive adhesive 19 or the double-face tape. Other adhesion means capable of adhering the parts of the film 11 can also be used.

A terminal portion 17 is formed at one end of the film 11 (see FIG. 1(B)). A reinforcement plate 16 is pasted on the rear side of the terminal portion 17 in the film 11. There is an extension portion 18 between a part in which the reinforcement plate 16 and the terminal portion 17 are formed and a part in which the position sensor and the pressure sensitive sensor are formed.

As shown in FIG. 1(B), the terminal portion 17 includes four terminals (1)-(4). In each of the terminals (1)-(4), a pressure sensitive ink 17a is superimposed and formed on a silver layer 17b. Each of the terminals (1)-(4) is electrically connected to one or more of the resistance membranes 12A, 12B and the membranes 13A, 13B by a drawing line.

The touch sensor 1 has a front surface panel 41. The front surface panel 41 is adhered to the laminated film 11 by an adhesive (for example, the double-face tape). FIG. 1(A) and FIG. 1(B) shows an example of using, as the adhesive, the double-face tape in which an adhesive compound 43 is laminated on a front surface and a rear surface of a support 42. The front surface panel 41 is a member for a human finger or the like to contact and uses, for example, a polycarbonate (PC) sheet such as CARBOGLASS (registered trademark) as a material. However, the material of the front surface panel 41 is not limited to PC sheet.

Figure 2:
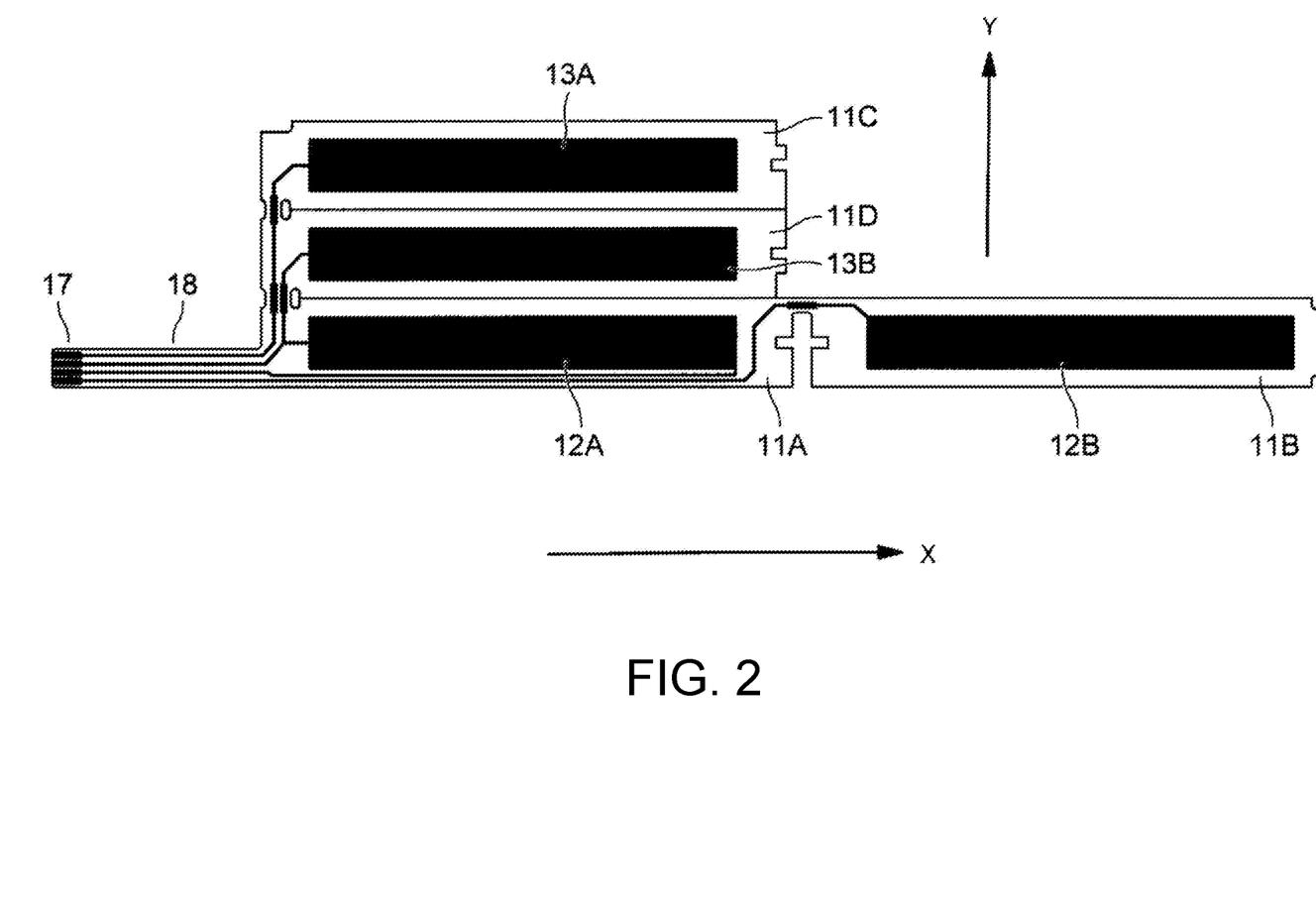
FIG. 2 is a plan view showing an expanded state (a state before a use form is formed) of the touch sensor.

FIG. 2 is a plan view showing the touch sensor before a use form (a folded state) is formed. As shown in FIG. 2, the film 11 includes four parts 11A, 11B, 11C, 11D.

The resistance membrane 12A (see FIG. 1(A) and FIG. 1(B)) is formed on a part of the front surface of the part 11A closest to the extension portion 18. The resistance membrane 12B (see FIG. 1(A) and FIG. 1(B)) is formed on a part of the front surface of the part (the part on the right in FIG. 2) 11B adjacent to the part 11A in an X-direction (a longitudinal direction). The membrane 13A (see FIG. 1(A) and FIG. 1(B)) made of pressure sensitive ink is formed on a part of the front surface of another part (the upper part in FIG. 2) 11D adjacent to the part 11A in a Y-direction (a width direction). The membrane 13B (see FIG. 1(A) and FIG. 1(B)) made of pressure sensitive ink is formed on a part of the front surface of the part 11C adjacent to the part 11D in the Y-direction. Besides, in the embodiment, the plane shapes of the resistance membranes 12A, 12B and the membranes 13A, 13B are, but not limited to, rectangular shapes. For example, the plane shapes may be ellipse shapes.

In addition, the part 11A and the part 11B can also be seen as being adjacent via a boundary in the width direction (the Y-direction). The part 11A and the part 11D can also be seen as being adjacent via a boundary in the longitudinal direction (the X-direction). The part 11D and the part 11C can also be seen as being adjacent via the boundary in the longitudinal direction (the X-direction).

In addition, in FIG. 2, a line segment between the parts indicates the boundary of the parts. An ellipse on the boundary of the part 11A and the part 11D and an ellipse on the boundary of the part 11C and the part 11D are holes.

The part 11B in the touch sensor shown in FIG. 2 before a use form is formed is folded with respect to the part 11A, and the part 11C is folded with respect to the part 11D and further folded with respect to the part 11A; after that, the touch sensor 1 includes the part 11A on which the resistance membrane 12A for position detection is formed, the part 11B which is located below the part 11A and on which the resistance membrane 12B for position detection is formed, the part 11C which is located below the part 11B and on which the resistance membrane being pressure sensitive (the membrane 13A) is formed, and the part 11D which is located below the part 11C and on which the resistance membrane being pressure sensitive (the membrane 13B) is formed. Besides, the parts 11A, 11B, 11C, 11D are preferably formed by one base material (the film 11 in the embodiment). Then, for example, the parts are preferably formed by folding one base material. In addition, in the embodiment, "below the part" refers to a lower portion in a position relationship when the position of the front surface panel 41 is regarded as an upper portion.

Figure 3:
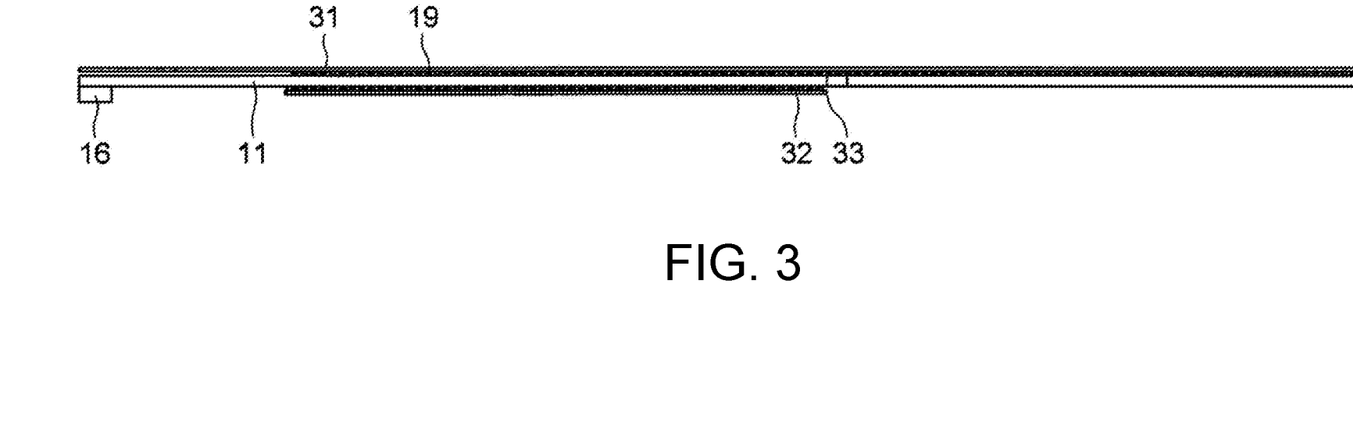
FIG. 3 is a cross-sectional view showing the expanded state (the state before a use form is formed) of the touch sensor.

FIG. 3 is a cross-sectional view showing the touch sensor before a use form is formed. Besides, in FIG. 3, cross sections of the parts 11A, 11B on which the resistance membranes 12A, 12B in FIG. 2 are formed is shown. Accordingly, in FIG. 3, the pressure sensitive adhesive 19 exists on the upper surface side of the film 11. Besides, in the example shown in FIG. 3, a separator 31 is arranged on the upper surface side of the pressure sensitive adhesive 19. In addition, a condition is shown in which the double-face tape including the separator 32 and the adhesive 33 is pasted on the lower surface of a part (specifically, the part 11A) of the film 11.

Next, a formation method of the film 11 is described with reference to FIG. 4(A) to FIG. 4(F).

Firstly, a plan film which includes the four parts 11A, 11B, 11C, 11D in the film 11 constituting the expanded touch sensor 1 and the extension portion 18 (see FIG. 2) is prepared. Besides, the plan film may be a large-area film which includes the film 11 constituting a plurality of touch sensors 1. Besides, the film 11 may be polyimide (PI), polyester terephthalate (PET), polyethylene naphthalate (PEN) and the like.

Figure 4A:
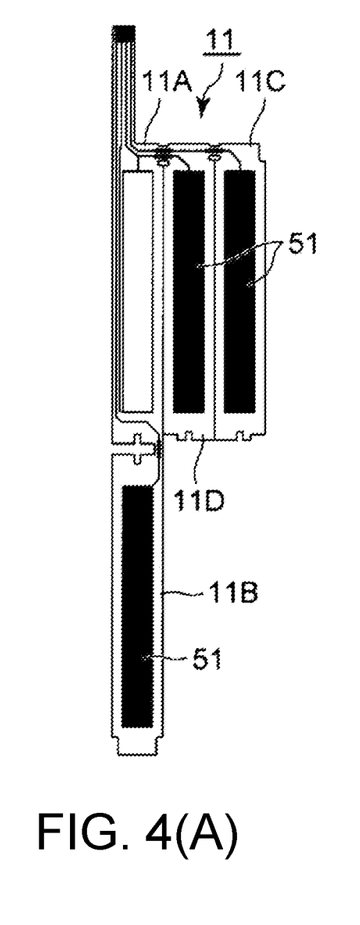
Figure 4B:
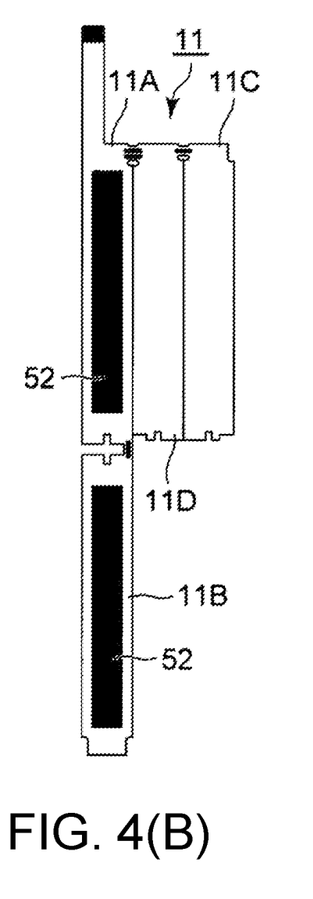

Next, as shown in FIG. 4(A), silver is printed (for example, screen printing) to places (see FIG. 2) in which the resistance membrane 12A and the membranes 13A, 13B made of pressure sensitive ink are formed and a place in which a drawing line toward the terminal portion 17 is formed, and a silver layer 51 is formed. Furthermore, as shown in FIG. 4(B), a conductive carbon (hereinafter referred to as carbon) 52 is printed (for example, screen printing) to places (see FIG. 2) in which the resistance membranes 12A, 12B in the parts 11A, 11B are formed. At this time, the carbon 52 is also printed to predetermined places in the drawing line. The predetermined places are places in which the parts 11B, 11C, 11D are folded back. Besides, in regard to the part 11B, the carbon 52 is printed onto the place in which the silver is printed so as to protect the silver layer 51.

Figure 4C:
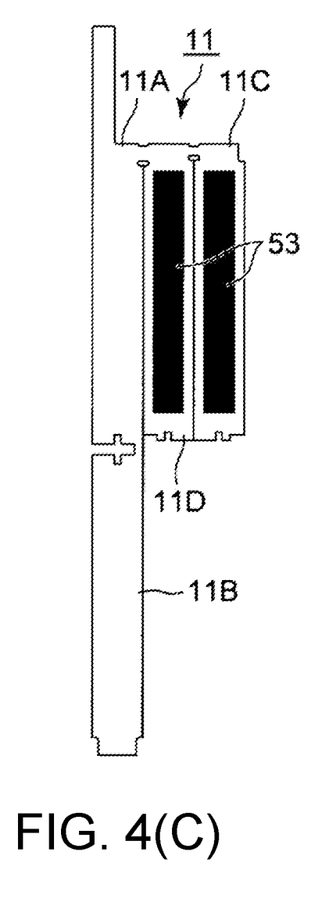

In addition, the pressure sensitive ink 53 is printed (for example, screen printing) to predetermined places of the parts 11C, 11D. Besides, the predetermined places are places (see FIG. 2) in which the membranes 13A, 13B are formed.

Figure 4D:
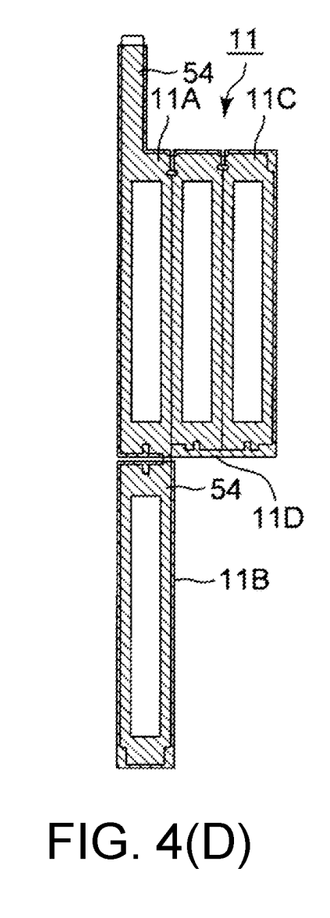

Furthermore, as shown in FIG. 4(D), a resist ink 54 is printed (for example, screen printing) to a place other than specified places. Besides, the specified places are the places in which the resistance membranes 12A, 12B are formed and the places in which the membranes 13A, 13B are formed on the parts 11A, 11B, 11C, 11D. In addition, the terminal portion 17 is also included in the specified places.

Figure 4E:
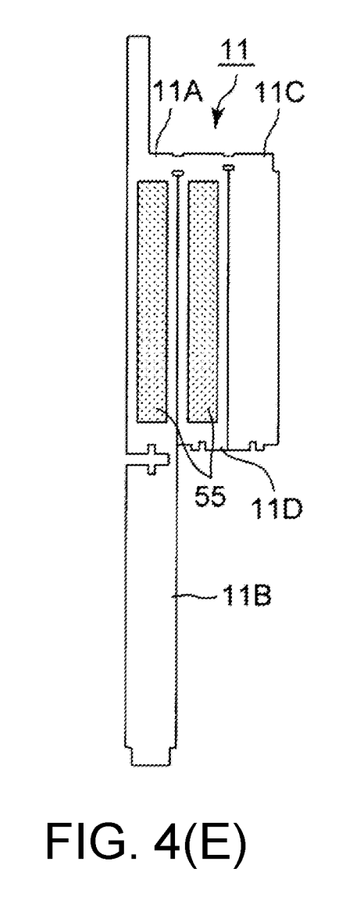

In addition, as shown in FIG. 4(E), to form spacer dots 55, a UV curable resin is intermittently printed (for example, screen printing) to the places (see FIG. 2) in which the resistance membrane 12A and the membrane 13B are formed on the parts 11A, 11D.

Figure 4F:
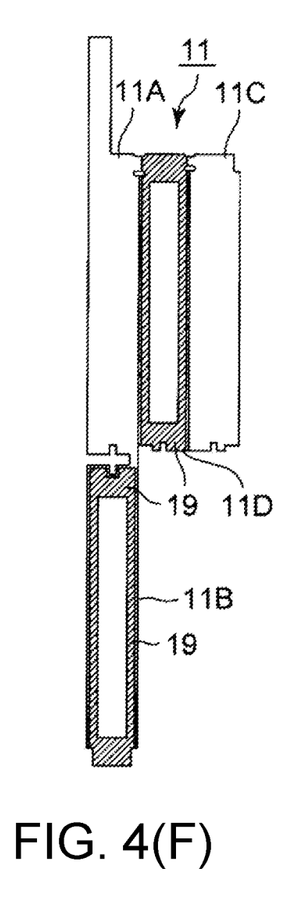

In addition, as shown in FIG. 4(F), the pressure sensitive adhesive 19 is printed (for example, screen printing) to a place other than the place (see FIG. 2) in which the resistance membrane 12B and the membrane 13B are formed on the parts 11B, 11D. Next, the separator 31 is arranged on the upper surface side of the pressure sensitive adhesive 19 (see FIG. 3). Besides, to simplify the operation, the separator 31 may also be arranged on the upper surface sides of all the parts 11A, 11B, 11C, 11D.

After that, the double-face tape is pasted on the rear surfaces of the parts 11C, 11D. Besides, the double-face tape on the rear surface of the part 11C is used for adhesion with the rear surface of the part 11B. The double-face tape on the rear surface of the part 11D is used for adhesion between the touch sensor 1 and other members. In addition, the reinforcement plate 16 is pasted on the rear surface of the terminal portion 17. Then, punching processing is performed to obtain the film 11 in the shape shown in FIG. 2 or the like.

Furthermore, the parts 11B, 11C, 11D are folded in the following procedure for example. The procedure is described with reference to FIG. 2-FIG. 4(A) to FIG. 4(F).

Firstly, the part 11C is bent toward the part 11D side so that a boundary of the part 11C and the part 11D is creased and the membranes 13A, 13B face each other. In addition, the part 11B is bent toward the part 11A side so that a boundary of the part 11A and the part 11B is creased and the resistance membranes 12A, 12B face each other.

After that, the parts 11A, 11B, 11C, 11D are temporarily expanded to return to the state as shown in FIG. 2. In this state, there are creases between the parts.

In this state, the separator 31 (see FIG. 3) on the front surface of the part 11D is peeled. When the separator 31 is arranged in all the parts 11A, 11B, 11C, 11D, the separators 31 on the front surfaces of the parts 11A, 11C, 11D are peeled. Then, the part 11C is folded again toward the part 11D side so that the membranes 13A, 13B face each other. Because the layer of the pressure sensitive adhesive 19 is formed on the front surface of the part 11D (see FIG. 4(F)), the front surface of the part 11C and the front surface of the part 11D are adhered.

Next, the separator 31 (see FIG. 3) on the front surface of the part 11B is peeled. Then, the part 11B is folded again toward the part 11A so that the resistance membranes 12A, 12B face each other. Because the layer of the pressure sensitive adhesive 19 is formed on the front surface of the part 11B (see FIG. 4(F)), the front surface of the part 11A and the front surface of the part 11B are adhered.

In addition, the separator 32 of the double-face tape pasted on the rear surface of the part 11C is peeled. Besides, in this state, the part 11B is folded toward the part 11A side, and the part 11C is folded toward the part 11D side. Then, the rear surface of the part 11C and the rear surface of the part 11B are adhered by the double-face tape.

Furthermore, the double-face tape is pasted on the rear surface of the front surface panel 41, and the front surface panel 41 and the part 11A of the film 11 are adhered by the double-face tape.

In this way, the touch sensor 1 shown in FIG. 1(A) and FIG. 1(B) is obtained.

Besides, the processes for bending or folding the four parts (the first part, the second part, the third part, and the fourth part) may be carried out manually or a jig for carrying out the processes may be used.

Figure 5:
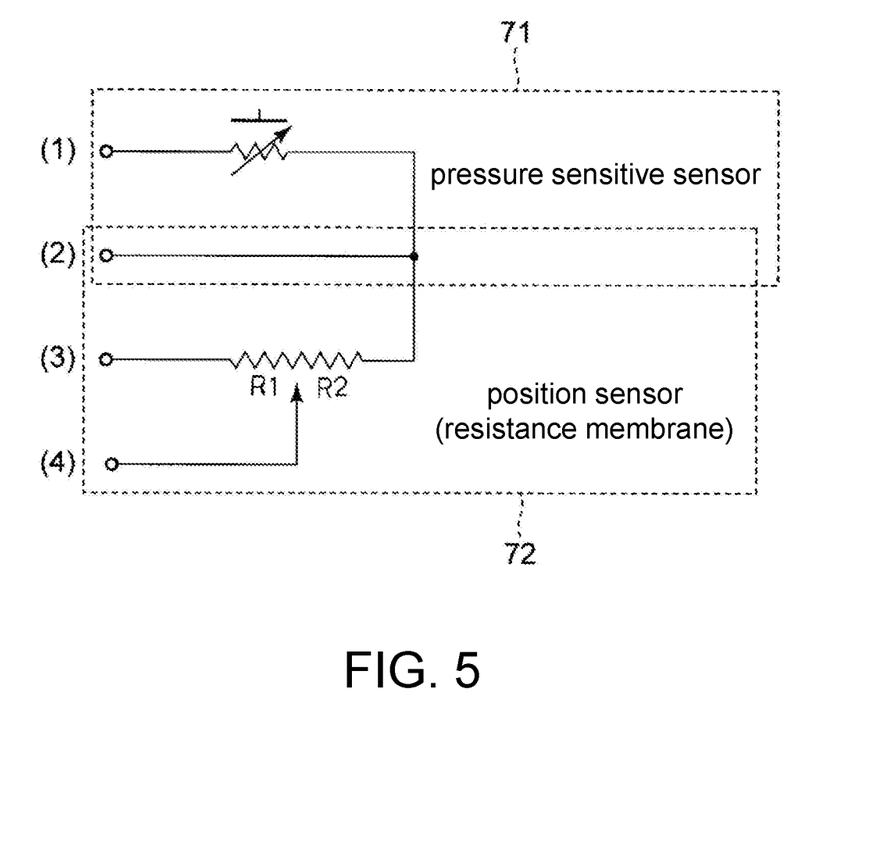
FIG. 5 is a circuit diagram showing schematic circuit configurations of a pressure sensitive sensor and a position sensor.

Next, actions of the position sensor formed on the parts 11A, 11B of the film 11 and the pressure sensitive sensor formed on the parts 11C, 11D of the film 11 are described with reference to FIG. 5-FIG. 7(A) and FIG. 7(B). FIG. 5 is a circuit diagram showing schematic circuit configurations of the pressure sensitive sensor and the position sensor. Besides, terminals (1)-(4) in FIG. 5 correspond to the terminals (1)-(4) in FIG. 1(B).

Figure 6A:
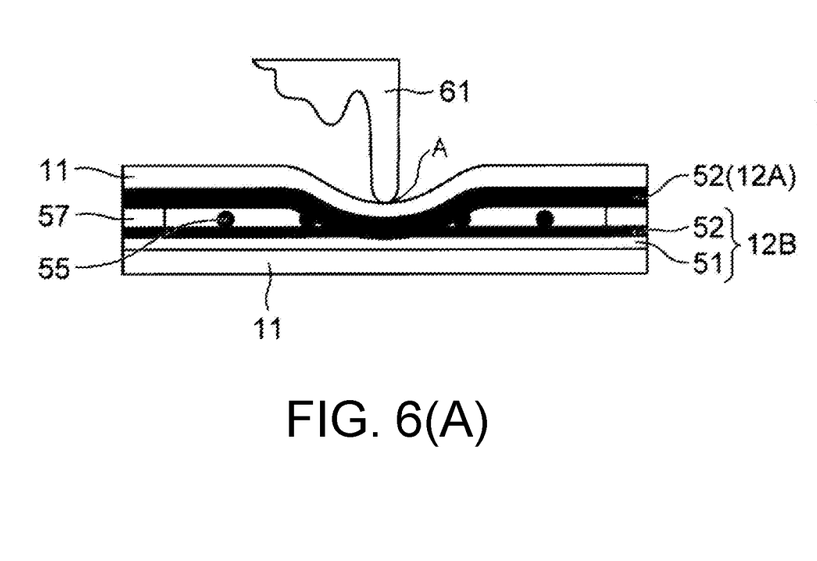
FIG. 6(A) is a cross-sectional view for illustrating an action of the position sensor.
Figure 6B:
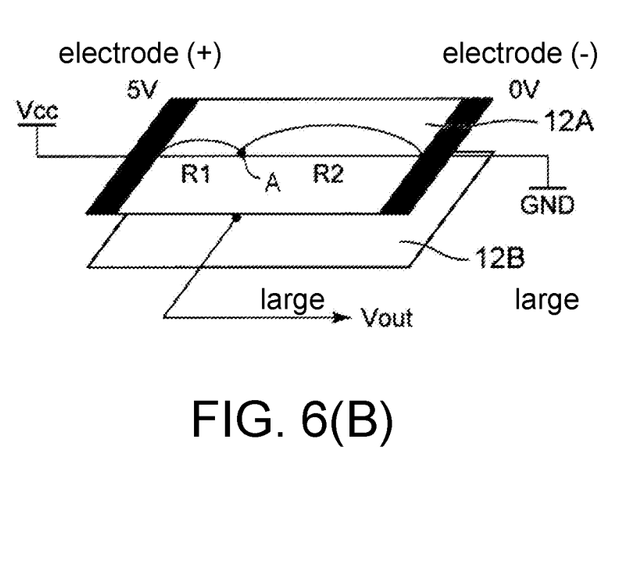
FIG. 6(B) is an illustration diagram for illustrating a detection principle.

FIG. 6(A) is a cross-sectional view for illustrating an action of the position sensor in the touch sensor 1. FIG. 6(B) is an illustration diagram for illustrating a detection principle.

The film 11 is shown in two places of FIG. 6(A), and the upper film 11 corresponds to the part 11A (see FIG. 2 and the like), and the lower film 11 corresponds to the part 11B (see FIG. 2 and the like). In addition, the carbon 52 on the upper side corresponds to the resistance membrane 12A (see FIG. 1(A) and FIG. 1(B) and the like), and the carbon 52 and the silver layer 51 on the lower side correspond to the resistance membrane 12B (see FIG. 1(A) and FIG. 1(B) and the like). Besides, in FIG. 7(A), the spacer dots 55 and the spacer 57 are also shown. The part of the spacer 57 includes the pressure sensitive adhesive 19 or the resist ink 54.

As shown in FIG. 6(B), a power-supply voltage (Vcc) and a ground potential (0 V) are supplied to two sides (black parts in FIG. 6(B)) of the resistance membrane 12A. Besides, the power-supply voltage (Vcc) and the ground potential (0V) are supplied from the terminal (3) and the terminal (2) in FIG. 5. However, the ground potential (0 V) may also be supplied from the terminal (3), and the power-supply voltage (Vcc) may also be supplied from the terminal (2). The place in which the Vcc is supplied is set as a power-supply electrode, and the place in which 0 V is supplied is set as a ground electrode. An output (Vout) is extracted from the drawing line connected to the resistance membrane 12B. Besides, the output is extracted from the terminal (4) in FIG. 5.

The direction orthogonal to the two sides of the resistance membrane 12A is set as an x-direction. As shown in FIG. 6(A), the human finger 61 or the like comes into contact with the touch sensor 1. R1 represents a resistance value between the power-supply voltage and a place A in contact with the human finger 61 or the like. R2 represents a resistance value between the place in contact with the human finger 61 or the like and the ground electrode.

The ratio of a distance from the place A to the electrodes on two ends is equivalent to the ratio of the resistance values of R1 and R2. Thus, when the resistance membrane 12A comes into contact with the resistance membrane 12B due to the contact of the human finger 61 or the like in the place A, a voltage corresponding to the position of the x-direction appears as the Vout.

Figure 7A:
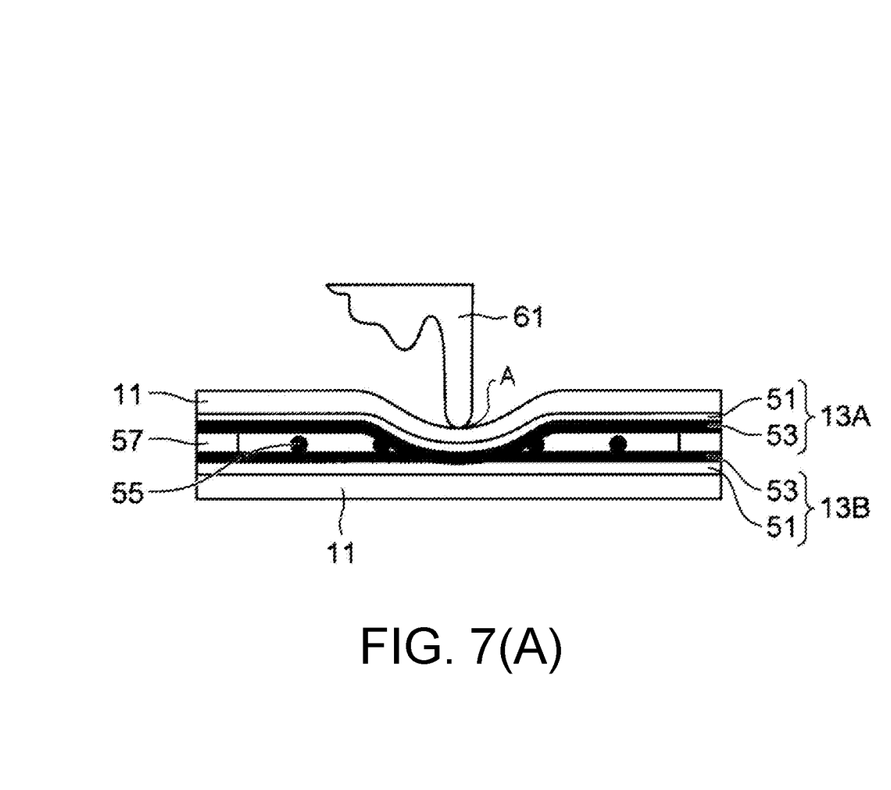
FIG. 7(A) is a cross-sectional view for illustrating an action of the pressure sensitive sensor.
Figure 7B:
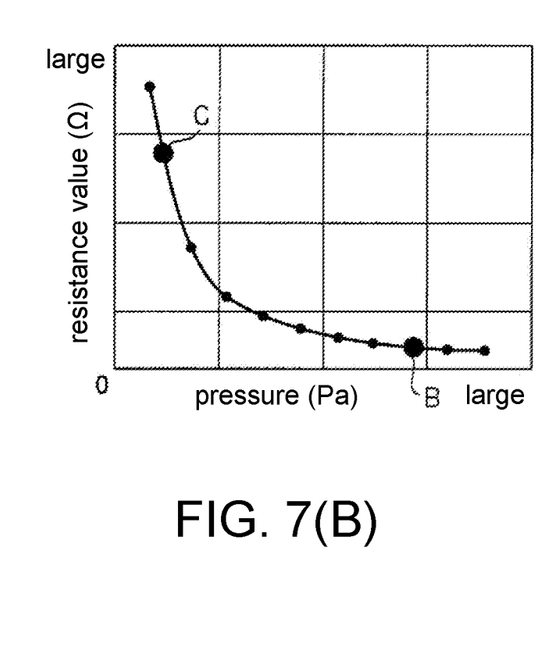
FIG. 7(B) is an illustration diagram showing an example of a resistance-load (pressure) characteristic in the pressure sensitive sensor.

FIG. 7(A) is a cross-sectional view for illustrating an action of the pressure sensitive sensor. FIG. 7(B) is an illustration diagram showing an example of a resistance-load (pressure) characteristic in the pressure sensitive sensor.

The film 11 is shown in two places of FIG. 7(A), and the film 11 on the upper side corresponds to the part 11C (see FIG. 2 and the like), and the film 11 on the lower side corresponds to the part 11D (see FIG. 2 and the like). In addition, the silver layer 51 and the pressure sensitive ink 53 on the upper side correspond to the membrane 13A (see FIG. 1(A) and FIG. 1(B) and the like), and the pressure sensitive ink 53 and the silver layer 51 on the lower side correspond to the membrane 13B (see FIG. 1(A) and FIG. 1(B) and the like). Besides, in FIG. 7(A), the spacer dot 55 and the spacer 57 are also shown. The part of the spacer 57 includes the pressure sensitive adhesive 19 or the resist ink 54.

As shown in FIG. 7(A), the human finger 61 or the like comes into contact with the touch sensor 1 in the place A. If the pressing pressure of the human finger 61 or the like is large when the membrane 13A and the membrane 13B become conductive due to the contact of the human finger 61 or the like, a contact area of the membrane 13A and the membrane 13B increases and a conductive resistance value is reduced. For example, the ground potential is supplied from the terminal (2) in FIG. 5 to the part 11C, and the output is extracted from the drawing line connected to the membrane 13B. Besides, the output is extracted from the terminal (1) in FIG. 5.

As shown by the resistance-load (pressure) characteristic shown in FIG. 7(B), the magnitude of the pressing pressure is expressed as the magnitude of the resistance value. In FIG. 7(B), a black circle B indicates that the pressing pressure is large and the resistance value detected as the output is small, and a black circle C indicates that the pressing pressure is small and the resistance value detected as the output is large.

As described above, the touch sensor 1 of the embodiment can detect the contact position of the human finger 61 or the like by the position sensor and can detect the pressing pressure of the human finger 61 or the like by the pressure sensitive sensor.

Besides, in the above embodiments, in the touch sensor 1, as shown in FIG. 2, in a state before the respective parts (the parts 11A, 11B, 11C, 11D) are folded, the second part (for example, the part 11B) is adjacent to the first part (for example, the part 11A) in the longitudinal direction of the first part, the fourth part (for example, the part 11D) is adjacent to the first part in the width direction (the direction orthogonal to the longitudinal direction) of the first part, and the third part (for example, the part 11C) is adjacent to the fourth part in the width direction of the fourth part.

However, the state before the touch sensor 1 is folded is not limited to the state as shown in FIG. 2.

Figure 8A:
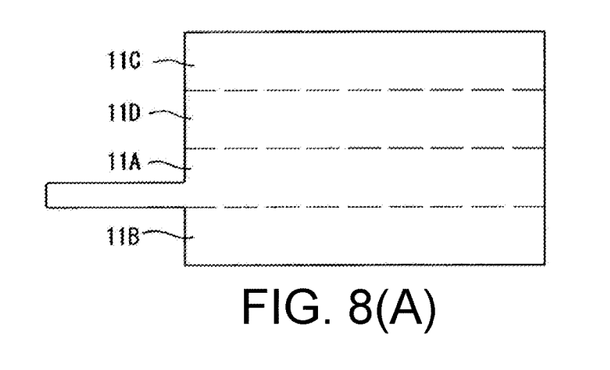
Figure 8B:
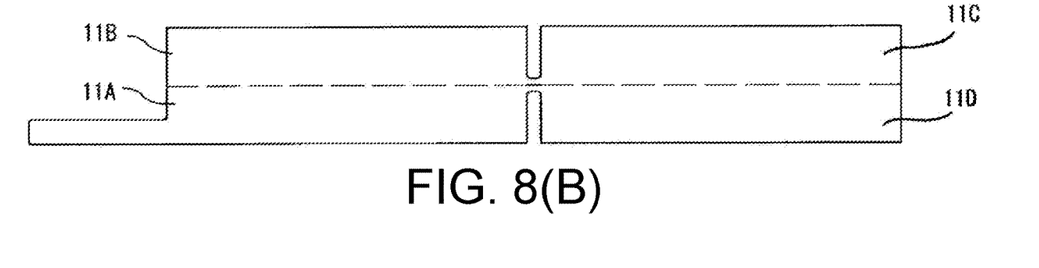
Figure 8C:
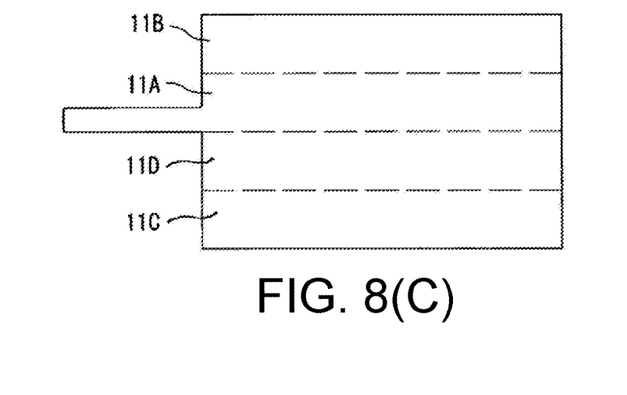

In FIG. 8(A) to FIG. 8(C), other examples of the expanded state (the state before a use form is formed) of the touch sensor are shown.

In the example shown in FIG. 8(A), in the state before the respective parts (the parts 11A, 11B, 11C, 11D) are folded, the second part (for example, the part 11B) is adjacent to the first part (for example, the part 11A) in the width direction of the first part, the fourth part (for example, the part 11D) is adjacent to the first part in the width direction of the first part, and the third part (for example, the part 11C) is adjacent to the fourth part in the width direction of the fourth part.

In the example shown in FIG. 8(B), in the state before the respective parts (the parts 11A, 11B, 11C, 11D) are folded, the second part (for example, the part 11B) is adjacent to the first part (for example, the part 11A) in the width direction of the first part, the fourth part (for example, the part 11D) is adjacent to the first part in the longitudinal direction of the first part, and the third part (for example, the part 11C) is adjacent to the fourth part in the width direction of the fourth part.

In the example shown in FIG. 8(C), in the state before the respective parts (the parts 11A, 11B, 11C, 11D) are folded, the second part (for example, the part 11B) is adjacent to the first part (for example, the part 11A) in the width direction of the first part, the fourth part (for example, the part 11D) is adjacent to the first part in the width direction of the first part, and the third part (for example, the part 11C) is adjacent to the fourth part in the width direction of the fourth part. Besides, different from the example shown in FIG. 8(A), in the example shown in FIG. 8(C), the second part is located below the first part in the case as shown in FIG. 8(A) to FIG. 8(C).

In addition, in the examples shown in FIG. 8(A) to FIG. 8(C), similar to the example shown in FIG. 2, the resistance membranes 12A and 12B are formed on the first part and the second part (corresponding to the parts 11A, 11B shown in FIG. 8(A) to FIG. 8(C)) of the film 11, and the membranes 13A and 13B are formed on the third part and the fourth part (corresponding to the parts 11C, 11D shown in FIG. 8(A) to FIG. 8(C)) of the film 11.

In addition, in the examples shown in FIG. 8(A) to FIG. 8(C), the respective parts are folded in the same procedure as the case of the example shown in FIG. 2, and thereby the touch sensor 1 shown in FIG. 1(A) and FIG. 1(B) is obtained.

In the touch sensor of the disclosure, one base material (for example, the film 11) includes four parts (the first part, the second part, the third part, and the fourth part, which are, for example, the part 11A, the part 11B, the part 11C, and the part 11D), resistance membranes for position detection (for example, the resistance membranes 12A, 12B) are formed on each of the first part (for example, the part 11) and the second part (for example, the part 11B) which are two adjacent parts in the four parts, resistance membranes being pressure sensitive (for example, the membranes 13A, 13B made of pressure sensitive ink 53) are formed on each of the third part (for example, the part 11C) and the fourth part (for example, the part 11D) which are the other two adjacent parts in the four parts; the second part is laminated by being folded with respect to the first part, the third part is laminated by being folded with respect to the fourth part, and the two parts (for example, a laminate of the parts 11A, 11B and a laminate of the parts 11C, 11D) formed by folding are interfolded; due to this structure, the amount of components of the touch sensor 1 is reduced compared with a case in which the position sensor and the pressure sensitive sensor are separately fabricated. As a result, the touch sensor 1 can be manufactured inexpensively. In addition, because one base material is folded and manufactured, assembling of the touch sensor becomes simple. For example, when the position sensor and the pressure sensitive sensor are fabricated separately, alignment in high accuracy is required when the position sensor and the pressure sensitive sensor are integrated; in comparison, the alignment is relatively easy in the touch sensor of the disclosure. Furthermore, because the position sensor and the pressure sensitive sensor are formed on one member (the film 11), the terminal portion 17 can be aggregated and arranged on the same plane.

In addition, the position sensor and the pressure sensitive sensor can be appropriately applied, by being used in combination, in an electronic musical instrument capable of controlling the strength of sound according to a contact degree of the human finger 61 or the like.

In addition, in the embodiment, the touch sensor is also disclosed in which the resistance membranes for position detection made of carbon or made of silver and carbon is formed on the first part (for example, the part 11A) and the second part (for example, the part 11B) by screen printing, and the resistance membranes being pressure sensitive made of silver and pressure sensitive ink is formed on the third part (for example, the part 11C) and the fourth part (for example, the part 11D) by screen printing.

In addition, in the embodiment, the touch sensor is also disclosed in which the front surface of the first part (for example, the part 11A) and the front surface of the second part (for example, the part 11B) are adhered by the pressure sensitive adhesive for example, the front surface of the third part (for example, the part 11C) and the front surface of the fourth part (for example, the part 11D) are adhered by the pressure sensitive adhesive for example, and the rear surface of the second part and the rear surface of the third part are adhered by the double-face adhesive tape for example.

According to the disclosure, an inexpensive touch sensor can be provided while an increase in manufacturing processes is suppressed.

What is claimed is:

1. A touch sensor, comprising a structure in which one base material comprises four parts,
   a resistance membrane for position detection is formed on each of a first part and a second part which are two adjacent parts of the four parts whereby each resistance membrane has a rectangular shape,
   a resistance membrane being pressure sensitive is formed on each of a third part and a fourth part which are the other two adjacent parts of the four parts whereby each resistance membrane has a rectangular shape,
   the second part is laminated by being folded with respect to the first part to form a configuration capable of detecting a position based on ratio of resistance determined by the position of touch,
   the third part is laminated by being folded with respect to the fourth part to form a configuration capable of detecting a pressure, and
   the two parts formed by folding are interfolded to form a configuration capable of detecting a position and a pressure, wherein
   in a state before the four parts are folded, the second part is adjacent to the first part, the fourth part is adjacent to the first part, and the third part is adjacent to the fourth part, and wherein
   in a state after the four parts are folded, the second part is located below the first part, the third part is located below the second part, and the fourth part is located below the third part, so that the second part and the third part are sandwiched between the fourth part and the first part.

2. The touch sensor according to claim 1, wherein
   a front surface of the first part and a front surface of the second part are adhered,
   a front surface of the third part and a front surface of the fourth part are adhered, and
   a rear surface of the second part and a rear surface of the third part are adhered.

3. The touch sensor according to claim 1, wherein
   the surface of the first part on which the resistance membrane for position detection is formed and the surface of the second part on which the resistance membrane for position detection is formed are adhered,
   the surface of the third part on which the resistance membrane being pressure sensitive is formed and the surface of the fourth part on which the resistance membrane being pressure sensitive is formed are adhered, and
   the surface of the second part on which the resistance membrane for position detection is not formed and the surface of the third part on which the resistance membrane being pressure sensitive is not formed are adhered.

4. The touch sensor according to claim 1, wherein
   the resistance membrane for position detection made of carbon or made of silver and carbon is formed on the first part and the second part by screen printing, and
   the resistance membrane being pressure sensitive made of silver and pressure sensitive ink is formed on the third part and the fourth part by screen printing.

5. The touch sensor according to claim 1, wherein
   a terminal portion is formed at one end of the base material, and there is a reinforcement plate on a rear side of the terminal portion in the base material.

6. The touch sensor according to claim 5, wherein
the terminal portion comprises four terminals, and
each of the terminals is electrically connected to one or more of the resistance membrane for position detection and the resistance membrane being pressure sensitive by a drawing line.

7. The touch sensor according to claim 5, wherein
there is an extension portion between a part in which the reinforcement plate and the terminal portion are formed and a part in which the resistance membrane for position detection and the resistance membrane being pressure sensitive are formed.

8. A manufacturing method of touch sensor, wherein
a resistance membrane for position detection is formed on each of a first part and a second part which are two adjacent parts of four parts in a base material comprising the four parts whereby each resistance membrane has a rectangular shape,
a resistance membrane being pressure sensitive is formed on each of a third part and a fourth part which are the other two adjacent parts of the four parts whereby each resistance membrane has a rectangular shape,
the second part is laminated by being folded with respect to the first part to form a configuration capable of detecting a position based on ratio of resistances determined by the position of touch,
the third part is laminated by being folded with respect to the fourth part to form a configuration capable of detecting a pressure, and
the two parts formed by folding are interfolded to form a configuration capable of detecting a position and a pressure, wherein
in a state before the four parts are folded, the second part is adjacent to the first part, the fourth part is adjacent to the first part, and the third part is adjacent to the fourth part, and wherein
in a state after the four parts are folded, the second part is located below the first part, the third part is located below the second part, and the fourth part is located below the third part, so that the second part and the third part are sandwiched between the fourth part and the first part.

9. The manufacturing method of touch sensor according to claim 8, wherein
a front surface of the first part and a front surface of the second part are adhered,
a front surface of the third part and a front surface of the fourth part are adhered, and
a rear surface of the second part and a rear surface of the third part are adhered.

10. The manufacturing method of touch sensor according to claim 8, wherein
the surface of the first part on which the resistance membrane for position detection is formed and the surface of the second part on which the resistance membrane for position detection is formed are adhered,
the surface of the third part on which the resistance membrane being pressure sensitive is formed and the surface of the fourth part on which the resistance membrane being pressure sensitive is formed are adhered, and
the surface of the second part on which the resistance membrane for position detection is not formed and the surface of the third part on which the resistance membrane being pressure sensitive is not formed are adhered.

11. The manufacturing method of touch sensor according to claim 8, wherein
the resistance membrane for position detection made of carbon or made of silver and carbon is formed on the first part and the second part by screen printing, and
the resistance membrane being pressure sensitive made of silver and pressure sensitive ink is formed on the third part and the fourth part by screen printing.

* * * * *